United States Patent
Foottit et al.

(10) Patent No.: US 9,338,307 B1
(45) Date of Patent: May 10, 2016

(54) SYSTEM, METHOD, AND COMPUTER PROGRAM FOR UTILIZING AN ALTERNATIVE POLICY AND CHARGING RULES FUNCTION (PCRF) NODE IN A CONSUMER TELECOMMUNICATIONS NETWORK

(71) Applicant: Amdocs Software Systems Limited, Dublin (IE)

(72) Inventors: Thomas Alexander Foottit, Stittsville (CA); Yong Li, Kanata (CA); Elizabeth Janet Keddy, Ottawa (CA)

(73) Assignee: Amdocs Software Systems Limited, Dublin (IE)

( * ) Notice: Subject to any disclaimer, the term of this patent is extended or adjusted under 35 U.S.C. 154(b) by 120 days.

(21) Appl. No.: 14/207,280

(22) Filed: Mar. 12, 2014

Related U.S. Application Data

(60) Provisional application No. 61/820,733, filed on May 8, 2013.

(51) Int. Cl.
*H04M 11/00* (2006.01)
*H04M 15/00* (2006.01)

(52) U.S. Cl.
CPC .............. *H04M 15/64* (2013.01); *H04M 15/66* (2013.01)

(58) Field of Classification Search
CPC ..... H04M 15/66; H04M 15/00; H04M 15/80; H04M 15/64; H04M 15/8016
See application file for complete search history.

(56) References Cited

U.S. PATENT DOCUMENTS

| | | | |
|---|---|---|---|
| 2012/0221899 A1* | 8/2012 | Cervenak ............... | G06Q 10/10 714/48 |
| 2012/0320801 A1 | 12/2012 | Yang et al. | |
| 2013/0036032 A1* | 2/2013 | Cai ...................... | H04M 15/46 705/30 |
| 2014/0064151 A1 | 3/2014 | Shaik et al. | |
| 2014/0066004 A1 | 3/2014 | Shaik et al. | |
| 2014/0187195 A1* | 7/2014 | Pallares Lopez ... | H04L 12/1432 455/405 |

FOREIGN PATENT DOCUMENTS

WO WO2012/095697 * 7/2012

OTHER PUBLICATIONS

Notice of Allowance from U.S. Appl. No. 14/207,268, dated Sep. 14, 2015.

* cited by examiner

*Primary Examiner* — Ajit Patel
(74) *Attorney, Agent, or Firm* — Zilka-Kotab, PC

(57) ABSTRACT

A system, method, and computer program product are provided for utilizing an alternative Policy and Charging Rules Function (PCRF) node in a consumer telecommunications system. In use, an Sy session for a subscriber of a consumer telecommunications network is established, the Sy session being between a first PCRF node and an Online Charging System (OCS) node of the consumer telecommunications network. Additionally, the first PCRF node specifies an alternative PCRF node. Further, information associated with the Sy session is maintained at the alternative PCRF node. In addition, the first PCRF node is monitored and it is determined whether the first PCRF node is responsive to communication therewith. Responsive to determining that first PCRF node is not responsive to communication therewith, the Sy session is continued between the OCS node and the alternative PCRF node.

20 Claims, 5 Drawing Sheets

SYSTEM, METHOD, AND COMPUTER PROGRAM FOR UTILIZING AN ALTERNATIVE POLICY AND CHARGING RULES FUNCTION (PCRF) NODE IN A CONSUMER TELECOMMUNICATIONS NETWORK

CLAIM OF PRIORITY AND RELATED APPLICATIONS

This application claims the benefit of U.S. Provisional Application No. 61/820,733, filed May 8, 2013, the entire contents of which are incorporated herein by reference. This application is related to U.S. Provisional Application No. 61/820,731, filed May 8, 2013, and U.S. application Ser. No. 14/207,268, filed Mar. 12, 2014, the entire contents of which are incorporated herein by reference.

FIELD OF THE INVENTION

The present invention relates generally to the interface between a policy system and a charging system in a consumer telecommunications network.

BACKGROUND

In the context of 3GPP networks, the 3GPP Sy interface refers to the interface located between the Policy and Charging Rules Function (PCRF) and the Online Charging System (OCS). The Sy interface enables transfer of information relating to subscriber spending from the OCS to the PCRF.

The PCRF is a functional element that encompasses policy control decision and flow based charging control functionalities. The PCRF may take information on the subscriber's spending status into account in its policy decisions. The PCRF may request spending limit reporting for policy counters from the OCS.

The OCS typically maintains policy counter statuses applicable for a subscriber, reports the policy counter status values for the subscriber when requested to the PCRF, and reports a change to the PCRF when a policy counter status changes.

Currently, the 3GPP Sy standard does not specify geographic redundancy for the Sy protocol. There is thus a need for addressing these and/or other issues associated with the prior art.

SUMMARY

A system, method, and computer program product are provided for utilizing an alternative Policy and Charging Rules Function (PCRF) node in a consumer telecommunications system. In use, an Sy session for a subscriber of a consumer telecommunications network is established, the Sy session being between a first PCRF node and an Online Charging System (OCS) node of the consumer telecommunications network. Additionally, the first PCRF node specifies an alternative PCRF node. Further, information associated with the Sy session is maintained at the alternative PCRF node. In addition, the first PCRF node is monitored and it is determined whether the first PCRF node is responsive to communication therewith. Responsive to determining that first PCRF node is not responsive to communication therewith, the Sy session is continued between the OCS node and the alternative PCRF node.

DETAILED DESCRIPTION

Figure 1:
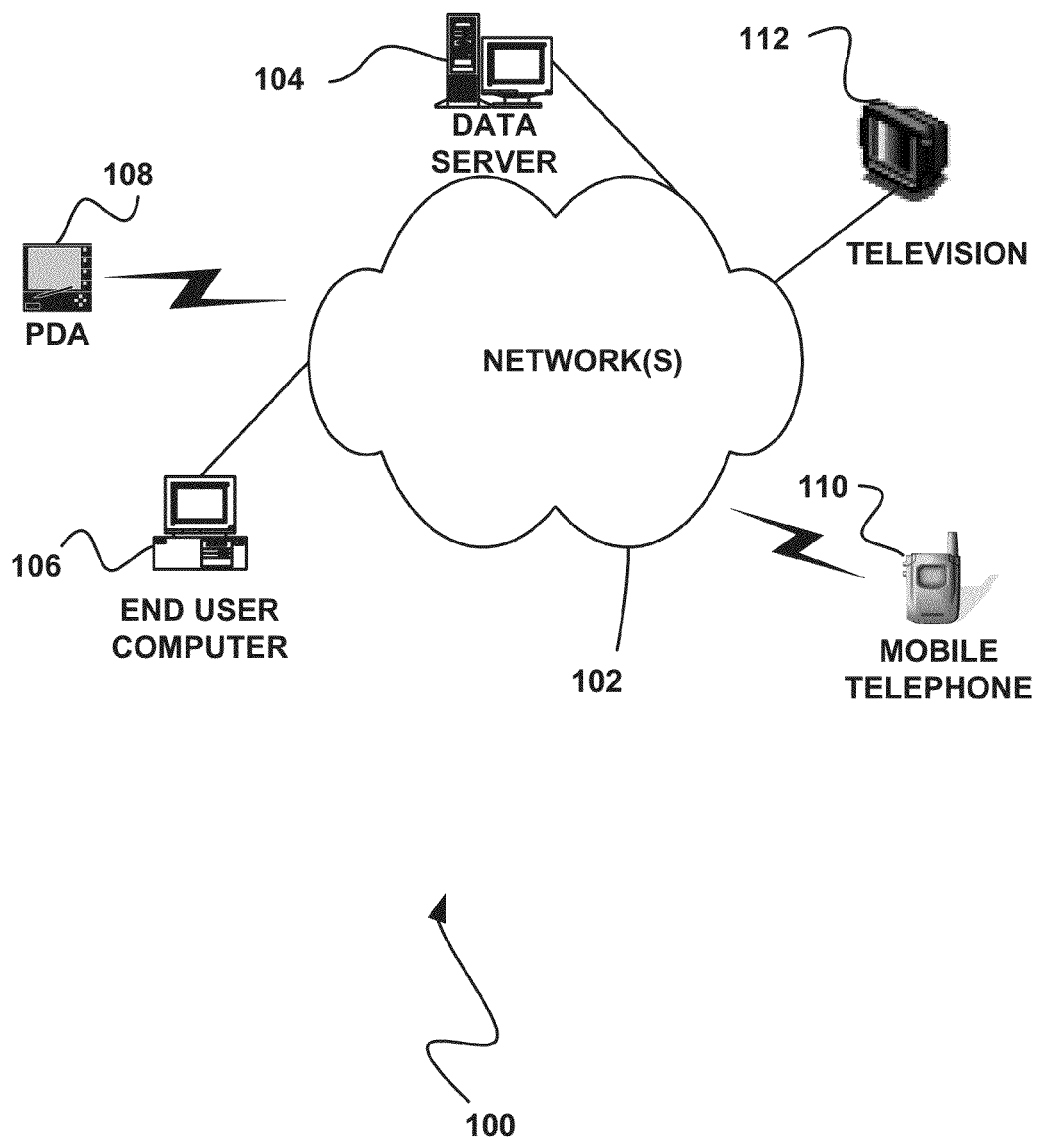
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
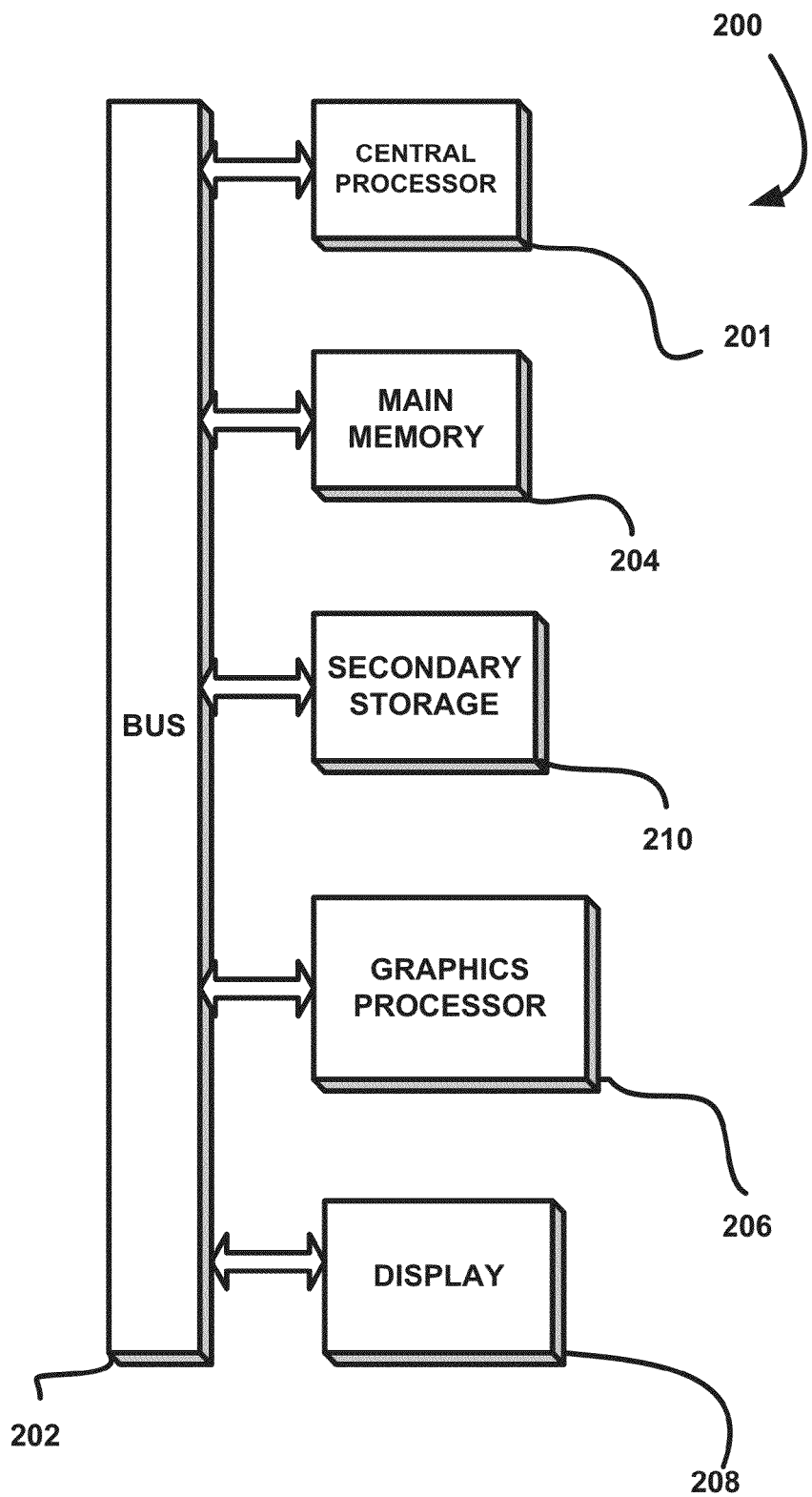
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
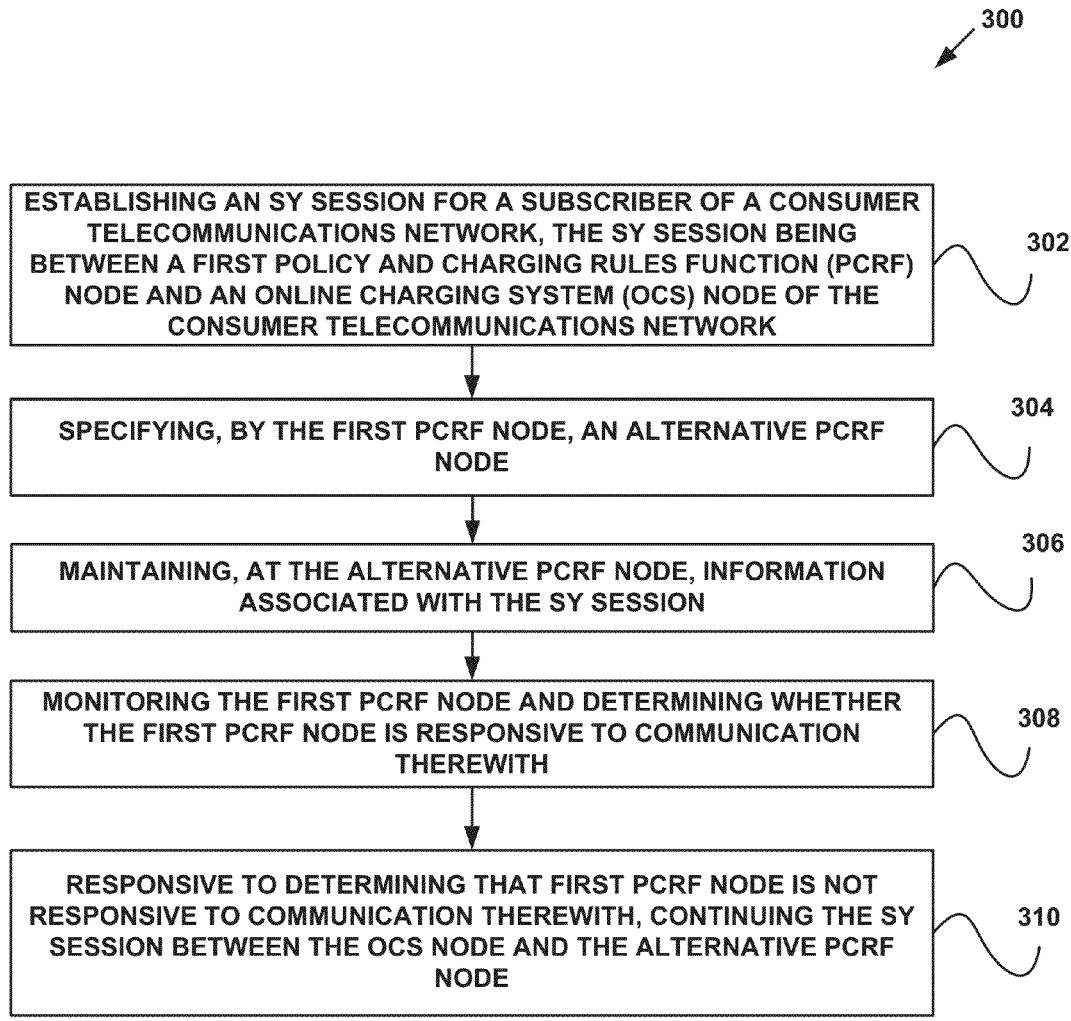
FIG. 3 illustrates a method for utilizing an alternative Policy and Charging Rules Function (PCRF) node in a consumer telecommunications system, in accordance with one embodiment.

FIG. 3 illustrates a method 300 for utilizing an alternative Policy and Charging Rules Function (PCRF) node in a consumer telecommunications system, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, an Sy session for a subscriber of a consumer telecommunications network is established, the Sy session being between a first PCRF node and an Online Charging System (OCS) node of the consumer telecommunications network. See operation 302.

In the context of the present description, the Sy session refers to a session associated with the interface between the PCRF node and the OCS node. In one embodiment, the Sy interface may function to enable transfer of information relating to subscriber spending from the OCS node to the PCRF node.

The PCRF node refers to a functional element that encompasses policy control decision and flow based charging control functionalities. The PCRF node may take information on the subscriber's spending status into account in its policy decisions. Additionally, the PCRF node may request spending limit reporting for policy counters from the OCS.

The OCS node refers to an element that functions to allow a communications service provider to charge customers based on service usage. In various embodiments, the OCS node may maintain policy counter statuses applicable for a subscriber, report the policy counter status values for the subscriber when requested to the PCRF, and/or report changes to the PCRF when a policy counter status changes, etc.

As shown in FIG. 3, the first PCRF node specifies an alternative PCRF node. See operation 304. The alternative PCRF node may be capable of all the same functionality as the first PCRF node.

Further, information associated with the Sy session is maintained at the alternative PCRF node. See operation 306. In one embodiment, the alternative PCRF node may be in a different geographical location than the first PCRF node.

The information associated with the Sy session may include any type of information. For example, in one embodiment, maintaining information associated with the Sy session at the alternative PCRF node may include maintaining a replica of the Sy session at the alternative PCRF node.

In addition, the first PCRF node is monitored and it is determined whether the first PCRF node is responsive to communication therewith. See operation 308. Responsive to determining that first PCRF node is not responsive to communication therewith, the Sy session is continued between the OCS node and the alternative PCRF node. See operation 310.

In one embodiment, the method 300 may include receiving a request to establish the Sy session for the subscriber of the consumer telecommunications network. For example, the first PCRF node may send the request to the OCS node to establish the Sy session. In this case, the request may include an Sy Spending Limit Request (SLR).

In one embodiment, the OCS node may communicate one or more Spending Status Notification Request (SNR) notification messages to the first PCRF node, in response to receiving the Sy Spending Limit Request. Additionally, in one embodiment, the first PCRF node may utilize the Sy Spending Limit Request to specify the alternative PCRF node.

For example, the Sy Spending Limit Request may identify the alternative PCRF node as a node to receive a subsequent one or more SNR notification messages if the first PCRF is determined to be disabled. In one embodiment, continuing the Sy session between the OCS node and the alternative PCRF node may include sending the subsequent one or more SNR notification messages to the alternative PCRF node.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
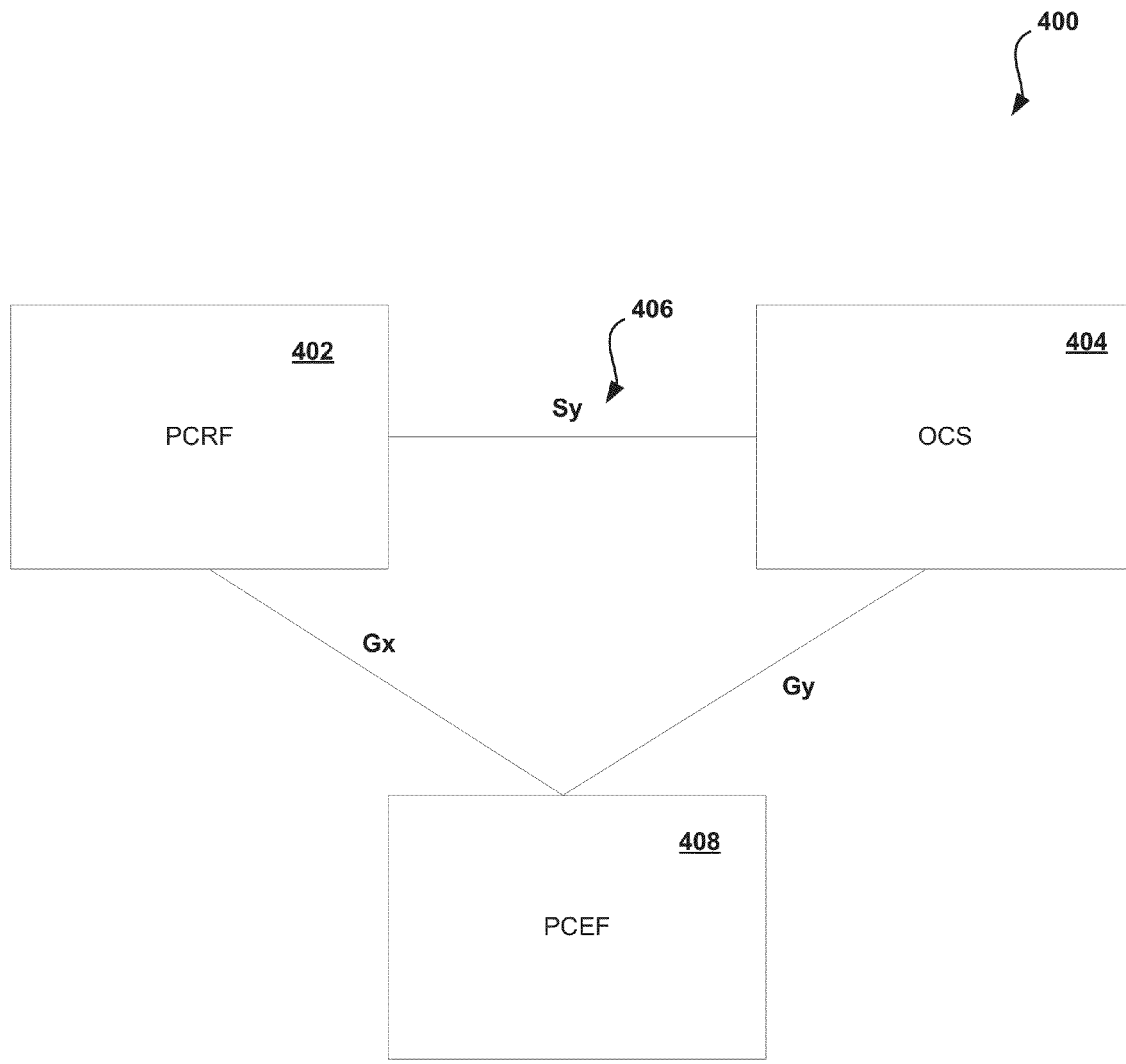
FIG. 4 illustrates a system for utilizing an alternative PCRF node in a consumer telecommunications system, in accordance with one embodiment.

FIG. 4 illustrates a system 400 for utilizing an alternative PCRF node in a consumer telecommunications system, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

FIG. 4 shows a functional block diagram illustrating the interfaces between a Policy and Charging Enforcement Function (PCEF) node 408, a PCRF node 402, and an OCS node 404 in a 3GPP network architecture. As shown, the system 400 further includes a 3GPP Sy interface 406.

In one embodiment, the system 400 may be utilized to manage an Sy session associated with the Sy interface 406 between the first PCRF node 402 and the OCS node 404 of a network.

Figure 5:
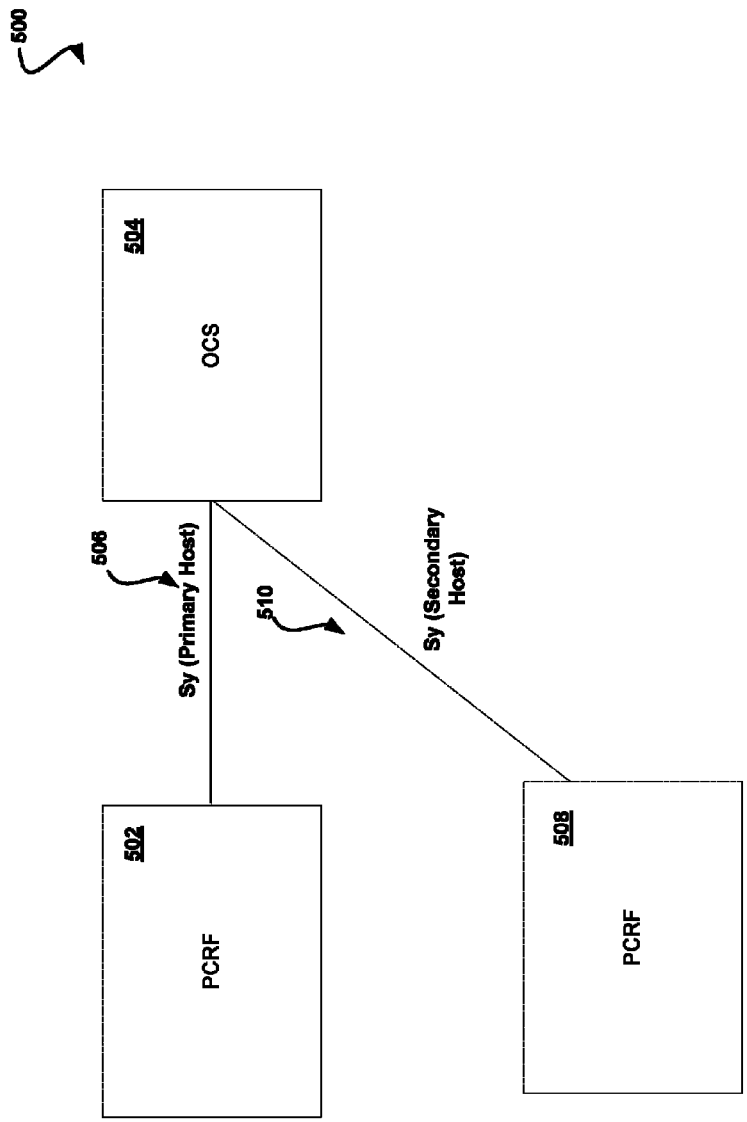
FIG. 5 illustrates a system for utilizing an alternative PCRF node in a consumer telecommunications system, in accordance with one embodiment.

FIG. 5 illustrates a system 500 for utilizing an alternative PCRF node in a consumer telecommunications system, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

In operation, a first Sy session 506 is established between a first PCRF node 502 and an OCS node 504. Responsive to establishing the first Sy session 506 between the first PCRF node 502 and the OCS node 504 of the network, the first PCRF node 502 specifies an alternative PCRF node 508. In one embodiment, a second Sy session 510 may be established.

Additionally, at the alternative PCRF node 508, a replica of the Sy session (or a second Sy session 510, etc.) is maintained. Further, the first PCRF node 502 is monitored and it is determined whether the first PCRF node 502 is responsive to communication therewith. Responsive to determining that first PCRF node 502 is not responsive to communication therewith, continuing the Sy session between the OCS node 504 and the alternative PCRF node 508.

In one embodiment, the system 500 may function to implement geographic redundancy. For example, when the first PCRF node 502 sends an Sy Spending Limit Request to the OCS node 504 to establish the session, the OCS node 504 may then communicate with the first PCRF node 502 for subsequent Spending Status Notification Request (SNR) notification messages.

In one embodiment, the first PCRF node 502 may specify the alternative PCRF node 508 as a secondary PCRF node to send the Sy SNR to in the event that the first PCRF node 502 is down. In one embodiment, the secondary PCRF node 508 may be in a different geographical location than the first PCRF node 502.

If the primary PCRF node 502 is not available, the OCS node 504 may then use the secondary PCRF node 508 that is specified in the original SLR message in which to send subsequent SNR messages. The secondary PCRF node 508 will have knowledge of the Sy session (e.g. utilizing replication between the PCRF nodes, etc.) and, in one embodiment, may communicate any changes over a Gx interface as a result of the counter change (e.g. the Gx interface illustrated in FIG. 4, etc.).

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
establishing an Sy session for a subscriber of a consumer telecommunications network, the Sy session being between a first Policy and Charging Rules Function (PCRF) node and an Online Charging System (OCS) node of the consumer telecommunications network;
specifying, by the first PCRF node, an alternative PCRF node;
maintaining, at the alternative PCRF node, information associated with the Sy session:
monitoring the first PCRF node and determining whether the first PCRF node is responsive to communication; and
responsive to determining that first PCRF node is not responsive to communication, continuing adjusting the Sy session so that it is between the OCS node and the alternative PCRF node.

2. The method of claim 1, further comprising receiving a request to establish the Sy session for the subscriber of the consumer telecommunications network.

3. The method of claim 2, wherein the first PCRF node sends the request to the OCS node to establish the Sy session.

4. The method of claim 3, wherein the request includes an Sy Spending Limit Request (SLR).

5. The method of claim 4, wherein the OCS node communicates one or more Spending Status Notification Request (SNR) notification messages to the first PCRF node, in response to receiving the Sy Spending Limit Request.

6. The method of claim 4, wherein the first PCRF node utilizes the Sy Spending Limit Request to specify the alternative PCRF node.

7. The method of claim 6, wherein the Sy Spending Limit Request identifies the alternative PCRF node as a node to receive a subsequent one or more SNR notification messages if the first PCRF is determined to be disabled.

8. The method of claim 7, wherein continuing the Sy session between the OCS node and the alternative PCRF node includes sending the subsequent one or more SNR notification messages to the alternative PCRF node.

9. The method of claim 1, wherein the alternative PCRF node is in a different geographical location than the first PCRF node.

10. The method of claim 1, wherein maintaining information associated with the Sy session at the alternative PCRF node includes maintaining a replica of the Sy session at the alternative PCRF node.

11. A computer program product embodied on a non-transitory computer readable medium, comprising:
computer code for establishing an Sy session for a subscriber of a consumer telecommunications network, the Sy session being between a first Policy and Charging Rules Function (PCRF) node and an Online Charging System (OCS) node of the consumer telecommunications network;
computer code for specifying, by the first PCRF node, an alternative PCRF node;
computer code for maintaining, at the alternative PCRF node, information associated with the Sy session:
computer code for monitoring the first PCRF node and determining whether the first PCRF node is responsive to communication; and
computer code for, responsive to determining that first PCRF node is not responsive to communication, adjusting the Sy session so that it is between the OCS node and the alternative PCRF node.

12. The computer program product of claim 11, further comprising computer code for receiving a request to establish the Sy session for the subscriber of the consumer telecommunications network.

13. The computer program product of claim 12, wherein the computer program product is operable such that the first PCRF node sends the request to the OCS node to establish the Sy session.

14. The computer program product of claim 13, wherein the computer program product is operable such that the request includes an Sy Spending Limit Request (SLR).

15. The computer program product of claim 14, wherein the computer program product is operable such that the OCS node communicates one or more Spending Status Notification Request (SNR) notification messages to the first PCRF node, in response to receiving the Sy Spending Limit Request.

16. The computer program product of claim 14, wherein the computer program product is operable such that the first PCRF node utilizes the Sy Spending Limit Request to specify the alternative PCRF node.

17. The computer program product of claim 16, wherein the computer program product is operable such that the Sy Spending Limit Request identifies the alternative PCRF node as a node to receive a subsequent one or more SNR notification messages if the first PCRF is determined to be disabled.

18. The computer program product of claim 17, wherein the computer program product is operable such that continuing the Sy session between the OCS node and the alternative PCRF node includes sending the subsequent one or more SNR notification messages to the alternative PCRF node.

19. The computer program product of claim 11, wherein the computer program product is operable such that the alternative PCRF node is in a different geographical location than the first PCRF node.

20. A system comprising:
a memory system; and
one or more processing cores coupled to the memory system and that are each configured to:
establish an Sy session for a subscriber of a consumer telecommunications network, the Sy session being between a first Policy and Charging Rules Function (PCRF) node and an Online Charging System (OCS) node of the consumer telecommunications network;
specify, by the first PCRF node, an alternative PCRF node;
maintain, at the alternative PCRF node, information associated with the Sy session:
monitor the first PCRF node and determining whether the first PCRF node is responsive to communication; and
responsive to determining that first PCRF node is not responsive to communication, adjust the Sy session so that it is between the OCS node and the alternative PCRF node.

* * * * *